United States Patent
Kawaai et al.

(10) Patent No.: US 6,820,983 B2
(45) Date of Patent: Nov. 23, 2004

(54) DICHROIC PRISM AND METHOD FOR MANUFACTURING THE SAME

(75) Inventors: Satoru Kawaai, Saitama (JP); Tomoaki Shigeta, Saitama (JP); Kouichirou Monma, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/696,566

(22) Filed: Oct. 30, 2003

(65) Prior Publication Data

US 2004/0119948 A1 Jun. 24, 2004

(30) Foreign Application Priority Data

Oct. 31, 2002 (JP) .................................. P2002-318101

(51) Int. Cl.[7] .................... G02B 21/28; G02B 21/00; G02B 5/04
(52) U.S. Cl. .................... 353/81; 353/31; 353/33; 353/81; 353/121; 359/833; 359/837
(58) Field of Search .................... 353/31, 33, 34, 353/37, 38, 81, 121, 122; 359/833, 837, 634, 900, 831

(56) References Cited

U.S. PATENT DOCUMENTS 6,411,449 B1 * 6/2002 Hashizume et al. ........ 359/831
6,665,123 B2 * 12/2003 Nakajo et al. .............. 359/634

FOREIGN PATENT DOCUMENTS

JP 10-39119 2/1998

* cited by examiner

*Primary Examiner*—David Gray
*Assistant Examiner*—Melissa J Koval
(74) *Attorney, Agent, or Firm*—Leydig, Voit & Mayer, Ltd.

(57) ABSTRACT

A dichroic prism 10 according to the present invention comprises first to fourth right angle prisms 12, 14, 16 and 18 respectively having first side faces 28, 34, 40 and 46, and second side faces 30, 36, 42 and 48, the side faces being arranged perpendicular to each other. A second bonded face 22 and a fourth bonded face 26, each having a dichroic film for a second color light, are arranged on the same plane. The first bonded face 20 and a third bonded face 26, each having the dichroic film for a first color light, are deviated by a predetermined distance. The distance of this deviation is adjusted so that an image formed by the light having reference image information corresponds to the image of the reference image information. The light is made incident on and reflected by the first bonded face and the third bonded face. Therefore, an appropriate image quality can be obtained without depending on a right angle precision.

8 Claims, 7 Drawing Sheets

DICHROIC PRISM AND METHOD FOR MANUFACTURING THE SAME

BACKGROUND OF THE INVENTION

1. Field of the Invention

The present invention relates to a dichroic prism used for color synthesis performed by a liquid crystal projector or the like and a method for manufacturing the same.

2. Related Background Art

In a full color liquid crystal projector, white light from a light source is resolved into three primary colors of light, which are red light, blue light, and green light, by a color resolving cross prism. Each of the three primary colors of light resolved by the color resolving cross prism are made incident on a liquid crystal display element corresponding to each color. The light made incident on the liquid crystal display element is modulated based on image information. The three lights outputted from the liquid crystal display element corresponding to the respective colors are synthesized into one light by the color synthesizing cross prism and projected on a screen.

The cross prism for synthesizing the three primary colors of light is a dichroic prism on which dichroic films having different reflection characteristics are formed on two diagonal planes, respectively. Such a dichroic prism consists of four right angle prisms. Each right angle prism has a triangle columnar shape whose cross section is a right isosceles triangle, having a first side face and a second side face in a mutually perpendicular relation.

Conventionally, the dichroic prism is manufactured in the following way. First, using two right angle prisms of four right angle prisms, the first side face of one of two prisms is bonded to the second side face of the other prism to manufacture a bonded prism. Moreover, the remaining two right angle prisms are similarly bonded to each other to manufacture another bonded prism. Then, these bonded prisms are bonded to each other to manufacture a dichroic prism.

The minimum angle formed by the first side face and the second side face in each of the four right angle prisms of the dichroic prism is substantially a right angle. However, in some cases, the minimum angle is slightly larger than a right angle or slightly smaller than a right angle. Moreover, the two bonded prisms are conventionally bonded to each other without using a special jig but by hand, and adjusted depending on the human eye. Consequently, when the dichroic prism is manufactured by bonding four right angle prisms, in some cases, a gap may be created at the center thereof.

When a gap is created at the center of the dichroic prism, a light made incident thereon is reflected at a different part because of the gap. Therefore, a double-line is generated on a screen on which a reflected light is projected. Moreover, for the fact that the minimum angle formed by the first side face and the second side face of the right angle prism is not a right angle, image sizes differ for each color light made incident on the dichroic prism.

As a method of reducing the gap at the center of the dichroic prism, a conventionally known technique provides a method for bonding right angle prisms by making a notch on part of the right angle prism and applying a guide to the notch (For example, see Japanese Patent Laid Open No. Hei 10-39119). In this case, since the guide is used, the gap portion can be reduced, compared with the case where right angle prisms are bonded by eye-adjustment. If the gap at the center is reduced, the condition that generates a double-line on the screen is improved.

However, the right angle prism cannot be freed from adverse effects due to the condition that the minimum angle formed by the first side face and the second side face thereof is not a right angle, that is, it cannot be freed from non-uniformity of the screen size caused by right angle precision. In order to prevent the degradation in image quality due to the right angle precision, the right angle precision is required to be kept at an extremely high level. However, if the precision is kept at an extremely high level, costs of polishing the right angle prism and the like are increased.

The present invention is accomplished in view of the above-described problems, and a major object of the present invention is to provide a dichroic prism capable of improving image quality while suppressing the cost, and a method for manufacturing the same.

SUMMARY OF THE INVENTION

According to one aspect of the present invention, provided is a dichroic prism comprising a first right angle prism, a second right angle prism, a third right angle prism, and a fourth right angle prism, each having a first and second side faces substantially perpendicular to each other, wherein the dichroic prism is a columnar body having a square shape in lateral cross section, the columnar body including: a first bonded face formed by bonding the first side face of the first right angle prism and the second side face of the second right angle prism; a second bonded face formed by bonding the first side face of the second right angle prism and the second side face of the third right angle prism; a third bonded face formed by bonding the first side face of the third right angle prism and the second side face of the fourth right angle prism; and a fourth bonded face by bonding the first side face of the fourth right angle prism and the second side face of the first right angle prism. The first bonded face and the third bonded face have dichroic films for first color light, which reflect the first color light and transmit there through second color light different in color from the first color light. Also, the second bonded face and the fourth bonded face have dichroic films for the second color light, which reflect the second color light and transmit the first color light therethrough. Further, the second bonded face and the fourth bonded face are arranged on the same plane, and the third bonded face is deviated from the first bonded face by a predetermined distance.

The distance is one, in which an image formed of the first color light having predetermined reference image information coincides with an image corresponding to the reference image information, the first color light being allowed to be incident onto the first and third bonded faces and being reflected thereon.

When the third bonded face is deviated with respect to the first bonded face by this distance, obtained is an optical quality of the image formed by the first color light having image information which is made incident on and reflected by the dichroic prism according to the present invention.

In addition, according to another aspect of the present invention, a method for manufacturing the dichroic prism described above is provided. The method for manufacturing the dichroic prism of the present invention includes: a first step of preparing a first right angle prism, a second right angle prism, a third right angle prism, and a fourth right angle prism, each having first and second side faces substantially perpendicular to each other; a second step of forming a dichroic film for first color light on the first side face of the first right angle prism, the dichroic film for the first color light reflecting the first color light and transmitting therethrough second color light different in color from the first color light, and forming a dichroic film for the second color light on the second side face of the first angle prism, the dichroic film for the second color light reflecting the second color light and transmitting the first color light therethrough; a third step of forming the dichroic film for the second color light on the first side face of the second right angle prism; a fourth step of forming the dichroic film for the first color light on the second side face of the fourth right angle prism; a fifth step of arranging the second side face of the first right angle prism and the first side face of the second right angle prism on the same plane, and of bonding the first side face of the first right angle prism and the second side face of the second right angle prism, thus manufacturing a first bonded prism in which a first bonded face having the dichroic film for the first color light is formed; a sixth step of arranging the second side face of the third right angle prism and the first side face of the fourth right angle prism on the same plane, and of bonding the first side face of the third right angle prism and the second side face of the fourth right angle prism, thus manufacturing a second bonded prism in which a third bonded face having the dichroic film for the first color light is formed; a seventh step of constituting a pre-dichroic prism by allowing a plane, which is formed of the second side face of the first right angle prism and the first side face of the second right angle prism in the first bonded prism, and a plane, which is formed of the second side face of the third right angle prism and the first side face of the fourth right angle prism in the second bonded prism, to face to each other and to contact each other; an eighth step of adjusting a position of the second bonded prim with respect to the first bonded prism such that an image formed of the first color light having predetermined reference image information coincides with an image corresponding to the reference image information, the first color light being allowed to be incident onto the first and third bonded faces in the pre-dichroic prism and being reflected thereon, thus deviating the first bonded face and the third bonded face from each other; and a ninth step of bonding the first bonded prism and the second bonded prism, thus forming the second bonded face and the fourth bonded face, each having the dichroic film for the second color light.

According to the method for manufacturing the dichroic prism of the present invention, the first bonded prism is manufactured so that the second side face of the first right angle prism and the first side face of the second right angle prism are arranged on the same plane. In addition, the second bonded prism is manufactured so that the second side face of the third right angle prism and the first side face of the fourth right angle prism are arranged on the same plane. Accordingly, when the first bonded prism and the second bonded prism are brought into contact to be formed in a columnar body having a square shape in lateral cross section, the angle formed by the second bonded face and the fourth bonded face, each having the dichroic film for the second color light, becomes precisely 180 degrees. Moreover, when the angles formed by the first side faces and the second side faces of each of the first to fourth right angle prisms are not 90 degrees, the error gives a adverse effect on the angle formed by the first bonded face and the third bonded face, each having a dichroic film for the first color light.

Meanwhile, the first bonded prism and the second bonded prism are adhered to form a pre-dichroic prism. In this state, the first color light is made incident on and reflected by the first bonded face and the third bonded face, thereby forming an image on the screen by the first color light reflected. Then, while observing the image, the position of the second bonded prism is adjusted so that the first bonded face and the third bonded face maybe deviated, in order to improve the image quality. Therefore, an optimal image quality can be obtained even when the angle formed by the first bonded face and the third bonded face is not 180 degrees. Thus, the image quality can be improved without depending on the right angle precision of the first to fourth right angle prisms, thereby not requiring sophisticated polishing to improve precision of the first to fourth right angle prisms.

Moreover, in the method for manufacturing a dichroic prism according to the present invention described above, an ultraviolet curable resin, which has the same refractive index as the first to fourth right angle prisms and is cured by being subjected to ultraviolet irradiation, is preferably used for bonding of the first right angle prism and the second right angle prism, for bonding of the third right angle prism and the fourth right angle prism, and for bonding of the first bonded prism and the second bonded prism.

The ultraviolet curable resin is cured when being irradiated with ultraviolet rays. Therefore, for example, in a stage of forming the dichroic prism with the first bonded prism and the second bonded prism, at least one of the first or the second bonded prism is coated with the ultraviolet curable resin, and the first bonded prism and the second bonded prism are temporarily bonded. In this stage, the ultraviolet curable resin is not cured, and therefore the position of the second bonded prism can be adjusted with respect to the position of the first bonded prism. By being irradiated with the ultraviolet ray when the position adjustment is completed, the first bonded prism and the second bonded prism can be bonded an optimal state.

Incidentally, a tenth step of forming the dichroic film for the first color light on the first side face of the first right angle prism may be performed in place of the second step and the third step. An eleventh step of forming the dichroic film for the second color light on any one of the plane, which is formed of the second side face of the first right angle prism and the first side face of the second right angle prism in the first bonded prism, and the plane which is formed of the second side face of the third right angle prism and the first side face of the fourth right angle prism in the second bonded prism, may be performed in place of the seventh step. Moreover, a twelfth step of allowing the first bonded prism and the second bonded prism to contact each other with the dichroic film for the second color light interposed therebetween to constitute the pre-dichroic prism maybe performed in place of the seventh step.

According to yet another aspect of the present invention, a dichroic prism manufacturing device used for the manufacturing method of the dichroic prism described above is provided. The dichroic prism manufacturing device comprises: a holder having a holding portion which holds the first bonded prism; a slide unit provided slidably on the holder, the slide unit being allowed to contact the second bonded prism arranged to constitute the pre-dichroic prism together with the first bonded prism held by the holder, and sliding the second bonded prism with respect to the first bonded prism; a position adjustment unit for sliding the slide unit with respect to the holder, the position adjustment unit being attached to the slide unit; a light source unit for making the light incident on the pre-dichroic prism held by the holding portion; and an image display unit for displaying the image formed of the light from the light source unit, the light being made incident onto the pre-dichroic prism held on the holder and being reflected on the first bonded face and the third bonded face.

With the above-described structure of the dichroic prism manufacturing device, the position of the second bonded prism with respect to the first bonded prism can be adjusted while actually viewing the image.

These and other features and advantages of the present invention will become apparent to those skilled in the art upon a reading of the following detailed description when taken in conjunction with the drawings wherein there is shown and described an illustrative embodiment of the invention.

DESCRIPTION OF THE PREFERRED EMBODIMENTS

Figure 1A:
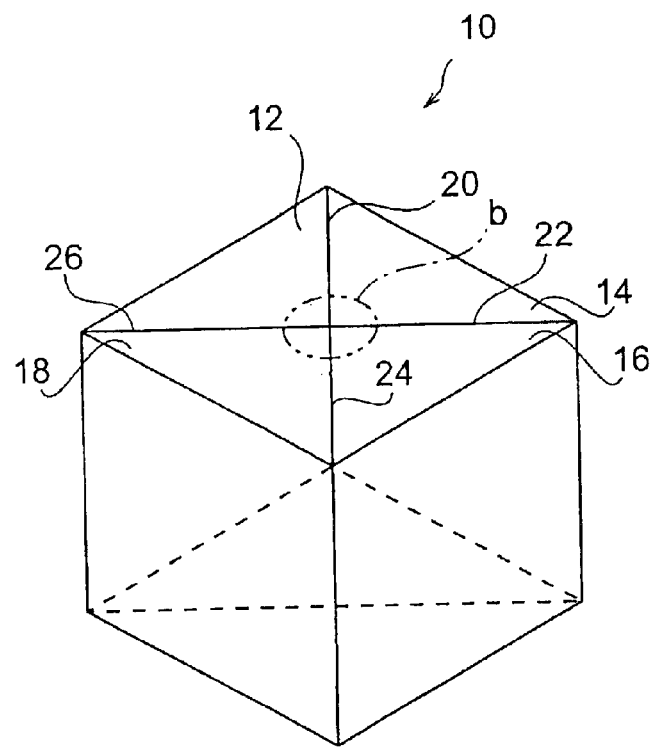
FIG. 1A is a perspective view showing one embodiment of the dichroic prism according to the present invention.

Now, referring to the drawings, the preferred embodiments of the present invention will be explained. In the following description, like references characters designate like or corresponding parts throughout the several views.

FIG. 1A shows a dichroic prism according to the present invention, and the dichroic prism is generally designated by the numeral 10. The dichroic prism 10 is used as a color synthesis optical element for synthesizing a blue light, a red light, and a green light into one light. These three color lights have image information and are outputted from three liquid crystal display elements corresponding to blue, red, and green, respectively, in a liquid crystal projector. In the liquid crystal projector, it is possible that the light synthesized by a color synthesizing optical element is projected on a screen, and a full-color image is displayed.

Figure 1B:
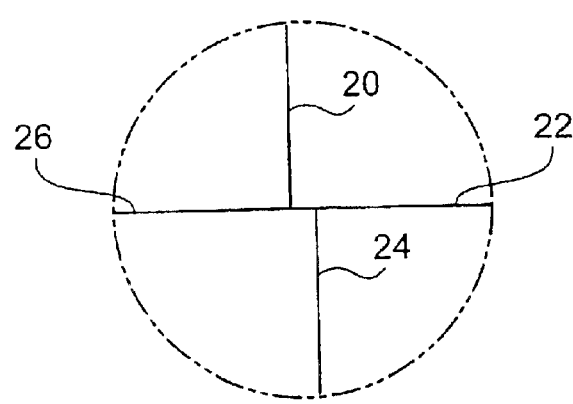
FIG. 1B is an enlarged view of an area b surrounded by a chain double-dashed line in FIG. 1A.
Figure 2:
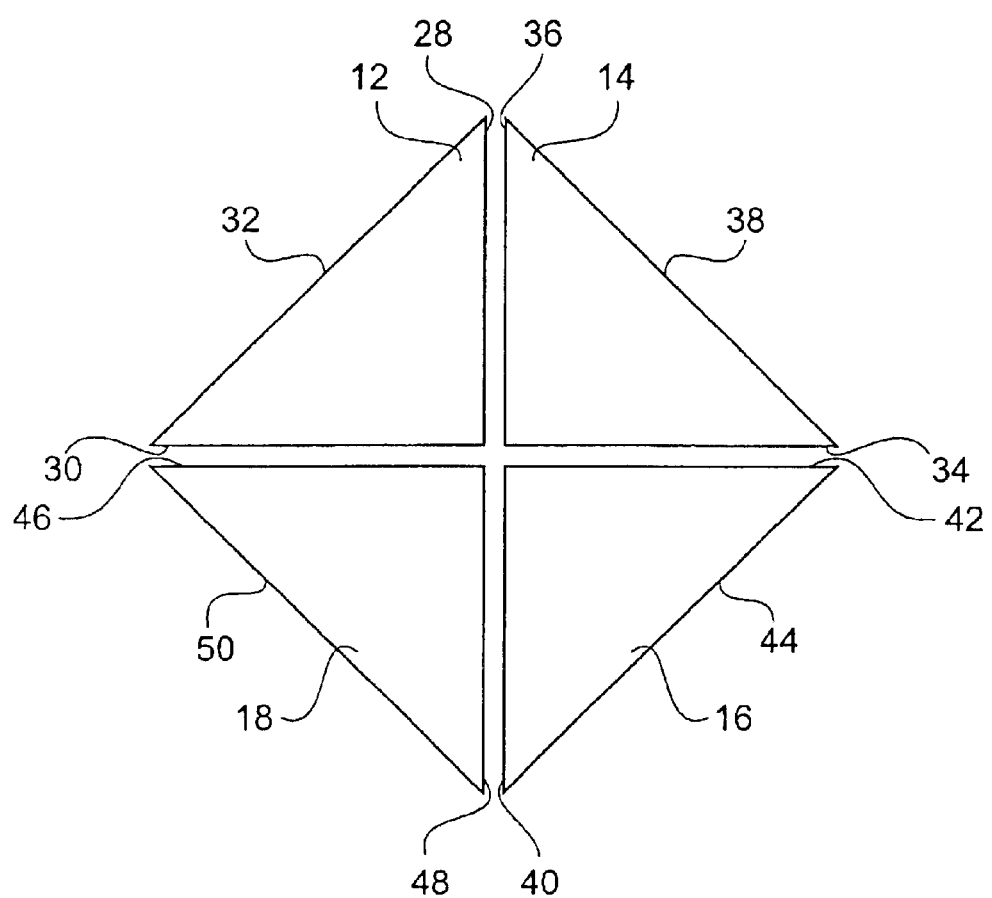
FIG. 2 is a view showing an arrangement of each element constituting the dichroic prism of FIG. 1A.

As shown in FIG. 1A, the dichroic prism 10 comprises a first right angle prism 12, a second right angle prism 14, a third right angle prism 16, and a fourth right angle prism 18, to be formed in a columnar body which is a square in cross section. Each of the right angle prisms 12 to 18 is formed in a triangle columnar shape which is a right isosceles triangle in transverse cross section. The dichroic prism 10 is formed by arranging and bonding the first to fourth right angle prisms 12 to 18 together as shown in FIG. 2. As shown in FIG. 1A, the dichroic prism 10 has a first bonded face 20, a second bonded face 22, a third bonded face 24, and a fourth bonded face 26. The second bonded face 22 and the fourth bonded face 26 have dichroic films for red light which allow the red light to reflect and allow the blue and green lights to transmit, forming a continuous plane. Meanwhile, the first bonded face 20 and the third bonded face 24 have dichroic films for blue light which allow the blue light to reflect and allow the red and green lights to transmit. As shown in FIG. 1B, the bonded faces 20 and 24 are arranged in almost parallel to each other and deviated from each other by a prescribed distance. The distance between the first bonded face and the third bonded face is adjusted so that full color image quality is optimal when the dichroic prism 10 is applied to a liquid crystal projector. Note that FIG. 1B is an enlarged view of a region surrounded by a chain double-dashed line in FIG. 1A.

Figure 3:
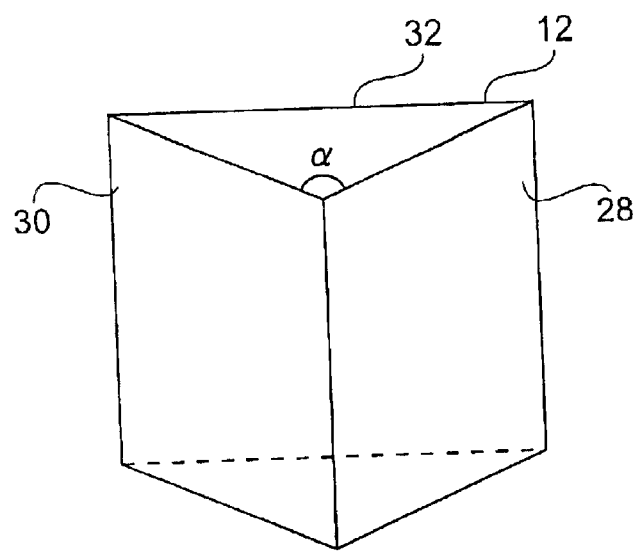
FIG. 3 is a perspective view of a first right angle prism constituting the dichroic prism of FIG. 1A.
Figure 4:
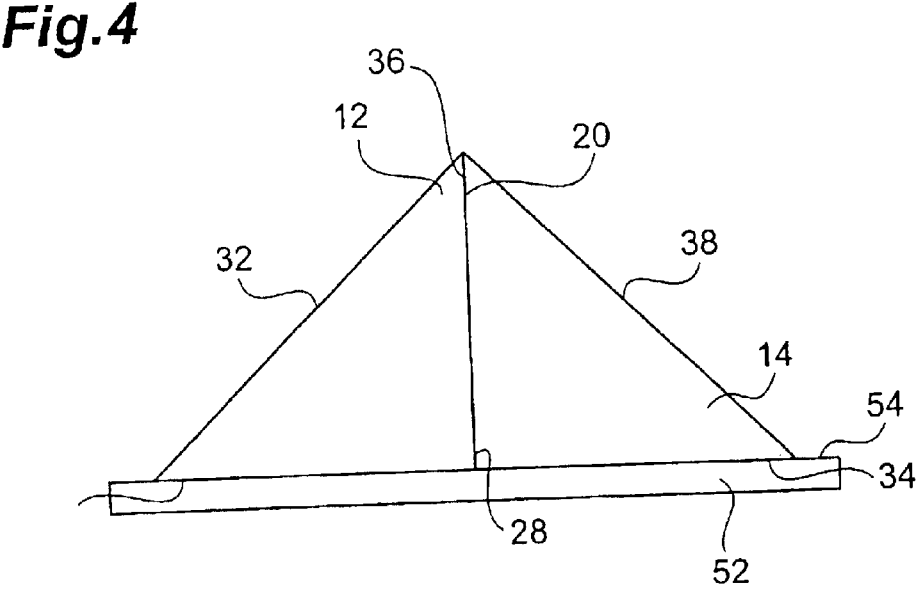
FIG. 4 is a view explaining one step of manufacturing steps for the dichroic prism of FIG. 1A.

The dichroic prism 10 with this arrangement is manufactured in the following way. FIG. 3 and FIG. 4 are views showing manufacturing steps.

First, the first to fourth right angle prisms 12 to 18 are prepared. As shown in FIG. 3, the first right angle prism 12 includes a first side face 28 and a second side face 30 arranged in a position substantially perpendicular to each other, and a third side face 32. It is preferable to set the width of the third side face 32 (length in a horizontal direction in FIG. 3) to about 40 mm, for example, for use in a liquid crystal projector. Optical surface polishing is provided for the first side face 28 and the second side face 30, by which an angle α therebetween is substantially made 90 degrees. The second to fourth right angle prisms 14 to 18 are substantially the same in shape as the first right angle prism 12. Therefore, as shown in FIG. 2, the second right angle prism 14 includes a first side face 34, a second side face 36, and a third side face 38. Further, the third right angle prism 16 includes a first side face 40, a second side face 42, and a third side face 44. Furthermore, the fourth right angle prism 18 includes a first side face 46, a second side face 48, and a third side face 50.

After preparing the first to fourth right angle prisms 12 to 18, a dichroic film for blue light is formed on the first side face 28 of the first right angle prism 12, and a dichroic film for red light is formed on the second side face 30. In addition, a dichroic film for red light is formed on the first side face 34 of the second right angle prism 14, and a dichroic film for blue light is formed on the second side face 48 of the fourth right angle prism 18.

Then, as shown in FIG. 4, the first right angle prism 12 and the second right angle prism 14 are placed on a flat plate-shaped base plate 52 so that the second side face 30 and the first side face 34 are brought into contact with an upper surface 54 of the base plate 52. The upper surface 54 of the base plate 52 is polished and flat. Next, on the base plate 52, the first side face 28 of the first right angle prism 12 and the second side face 36 of the second right angle prism 14 are brought into contact with each other. At this time, if a gap is created between the first side face 28 and the second side face 36, the first right angle prism 12 or the second right angle prism 14 is replaced with another prism. The first side face 28 and/or the second side face 36 are previously coated with an adhesive agent made of an ultraviolet curable resin. Note that an ultraviolet curable resin having substantially the same refractive index as that of the first to fourth right angle prisms 12 to 18 is used. Next, in a contact state, the first side face 28 and the second side face 36 are irradiated with an ultraviolet ray. Thus, the ultraviolet curable resin is cured, and the first right angle prism 12 and the second right angle prism 14 are bonded to each other. In this way, a first bonded prism 56 is manufactured. The first bonded prism 56 includes the first bonded face 20 having a dichroic film for blue light. The first bonded prism 56 is formed in a triangle columnar body which is a right isosceles triangle in cross section, in which the third side face 32 of the first right angle prism 12 and the third side face 38 of the second right angle prism 14 are arranged in a position substantially perpendicular to each other. Moreover, as shown in FIG. 5, the second side face 30 of the first right angle prism 12 and the first side face 34 of the second right angle prism 14 defines a first reference plane 58 serving as a single plane.

Similarly, the first side face 40 of the third right angle prism 16 and the second side face 48 of the fourth right angle prism 18 are bonded to each other to manufacture a second bonded prism 60 on which the third bonded face 24 having the dichroic film for blue light is formed. In the second bonded prism 60, a third side face 44 of the third right angle prism 16 and a third side face 50 of the fourth right angle prism 18 are arranged in a position substantially perpendicular to each other, and formed in a triangle columnar body of a right isosceles triangle in cross section. The first side face 46 and the second side face 42 form a second reference plane 62 serving as a single plane as shown in FIG. 5.

Figure 5:
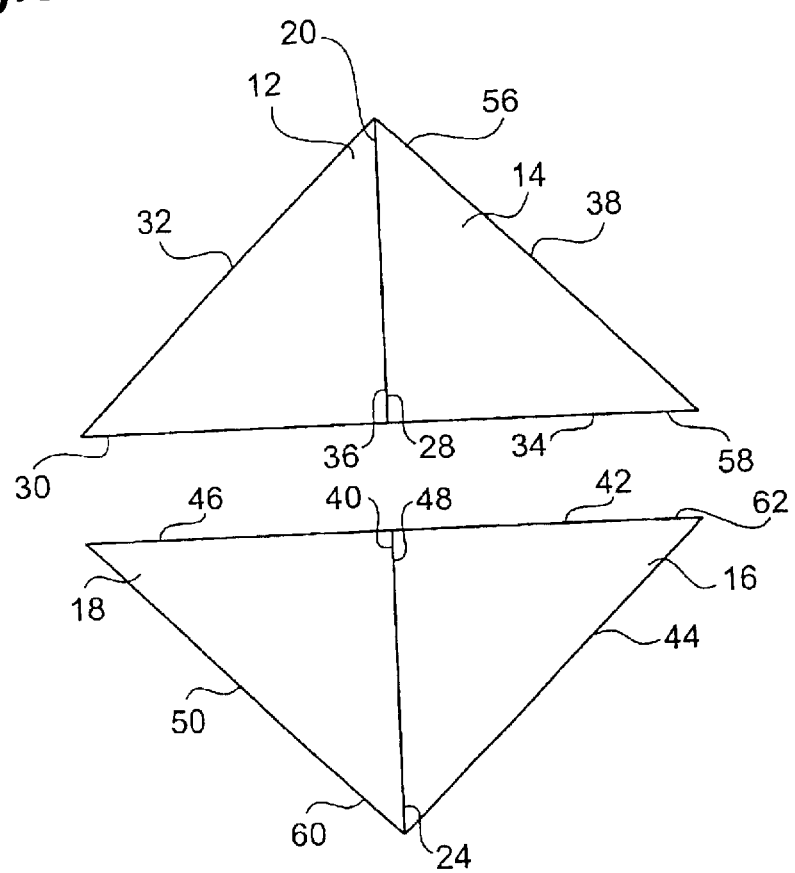
FIG. 5 is a view showing an arrangement of a first bonded prism and a second bonded prism.
Figure 6:
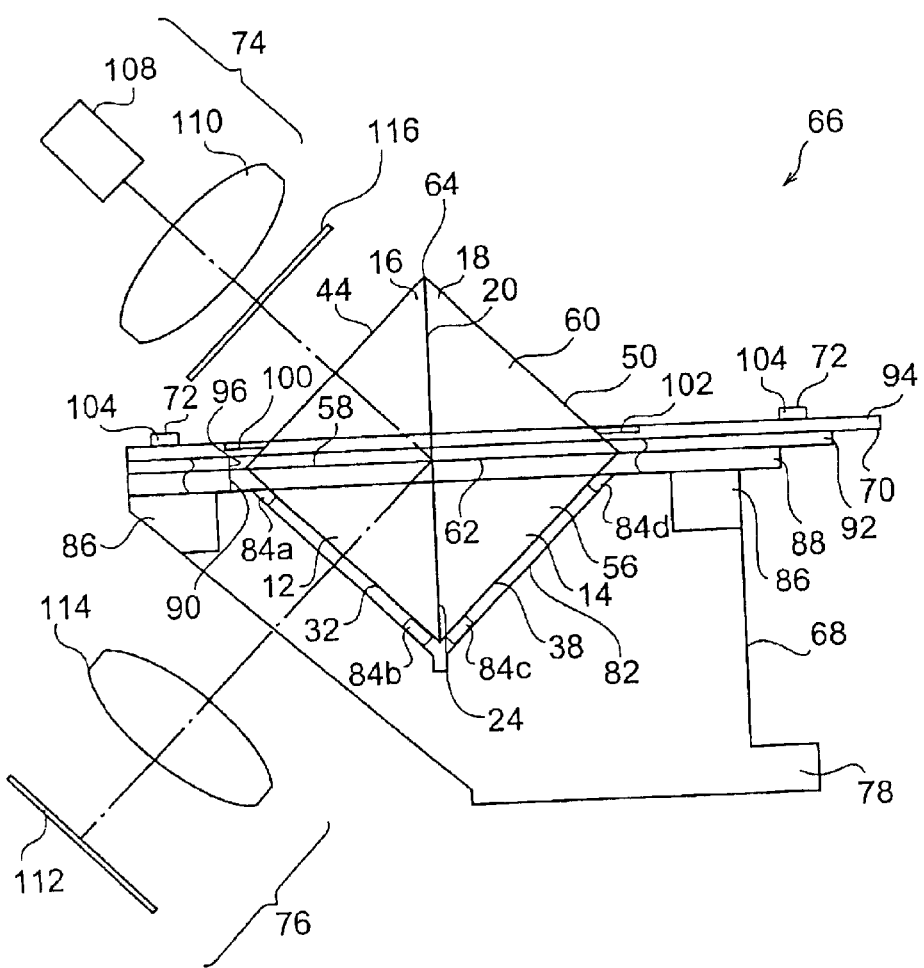
FIG. 6 is a schematic block diagram of a dichroic prism manufacturing device.
Figure 7:
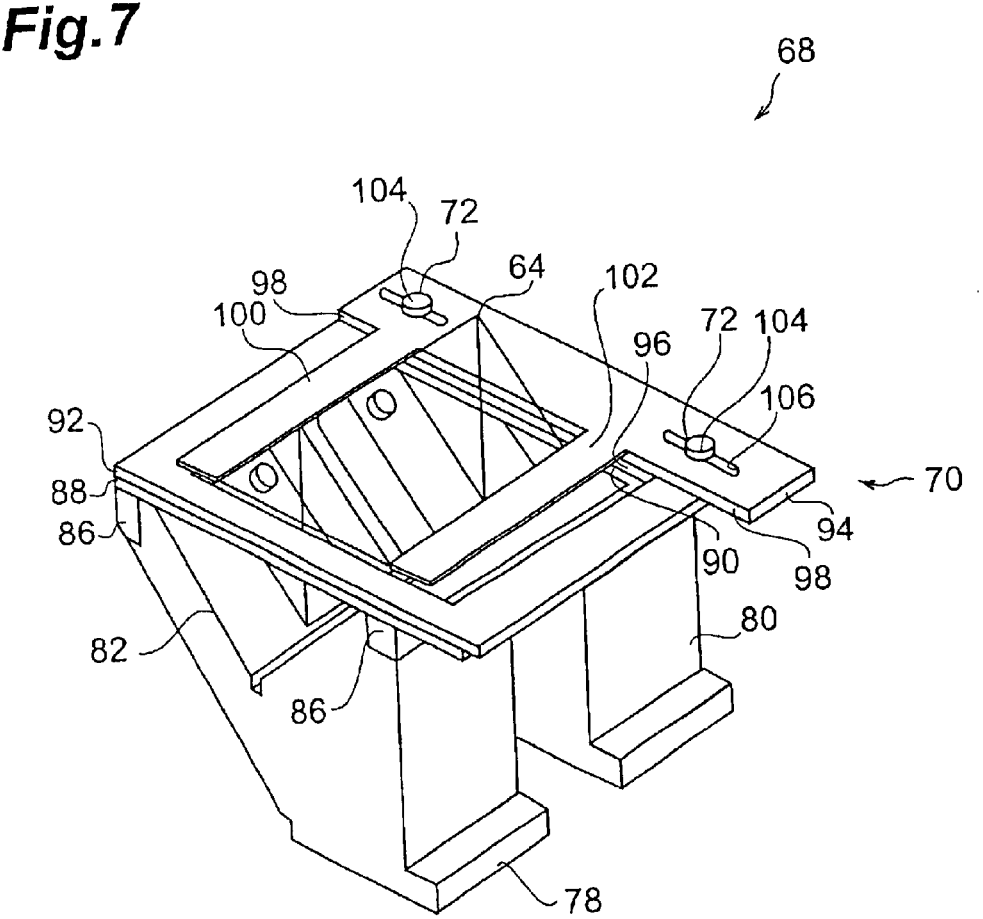
FIG. 7 is a perspective view schematically showing main part of the diachronic prism manufacturing device.

The dichroic prism 10 is manufactured by relatively bonding a first reference plane 58 of the first bonded prism 56 and a second reference plane 62 of the second bonded prism 60 to face each other, as shown in FIG. 5. In this document, a state where the first bonded prism 56 and the second bonded prism 60 are brought into contact is described, and a state before bonding is referred to as a pre-dichroic prism 64. In order to manufacture the dichroic prism 10 from the pre-dichroic prism 64, a dichroic prism manufacturing device 66 as shown in FIG. 6 and FIG. 7 is used. FIG. 7 is a view schematically showing a main part of the prism manufacturing device 66.

The prism manufacturing device 66 includes a holder 68, a slide unit 70, a position adjustment unit 72, a light source unit 74, and an image display unit 76.

The holder 68 has a leg 78 and a leg 80, as shown in FIG. 7. Since the leg 78 and the leg 80 are formed in the same shape, explanation will be given to the leg 78. The leg 78 has a holding unit 82 for holding the first bonded prism 56 formed thereon. As shown in FIG. 5, the holding unit 82 is formed with a notch at the upper central part of the leg 78 in a nearly right isosceles triangular shape with the right angle part located on the lower side. Projections 84a, 84b, 84c, and 84d are formed on the inside of the holding unit 82. The projections 84a and 84b support the third side face 32 of the first right angle prism 12 constituting the first bonded prism 56. Also, the projections 84c and 84d support the third side face 38 of the second right angle prism 14 constituting the first bonded prism 56. The projections 84a, 84b, 84c, and 84d are formed in the same shape. That is, the plane including the end face of 84a and the end face of 84b, and the plane including the end face of 84c and the end face of 84d are respectively inclined from a horizontal surface by 45 degrees, and the planes are arranged perpendicularly to each other. Also, notches are made on both edges of the upper end part of the leg 78, and a prismatic body 86 is located in the associated notches, thereby connecting the legs 78 and 80. Note that the upper surface of the prismatic body 86 and the upper surface of the legs 78 and 80 are arranged on the same plane. Moreover, the leg 78 and the leg 80 are arranged so that the distance therebetween may be slightly shorter than the height of the dichroic prism 10 shown in FIG. 1A.

A top plate 88 is attached to the upper surface of the legs 78, 80 and the upper surface of the prismatic body 86. In the central part of the top plate 88, as shown in FIG. 6 and FIG. 7, an opening 90 is formed in order to set the first bonded prism 56 and the second bonded prism 60 in the prism manufacturing device 66.

Also, on the upper side of the top plate 88, a slide part 70 is formed. The slide unit 70 has a reference plate 92 and a slide plate 94 for sliding along the reference plate 92. The reference plate 92 is fixed to the top plate 88, and an opening 96 similar to that of the top plate 88 is formed. The slide plate 94 is positioned above the leg 80 and can slide along the reference plate 92. The slide plate 94 may be attached to the reference plate 92 through a ball bearing, for example. The slide plate 94 has two position adjustment plates 100 and 102 extended from the side face 98 toward the leg 78, as shown in FIG. 7. The distance between the position adjustment plate 100 and the position adjustment plate 102 is slightly shorter than the width of the first reference plane 58 (length in the horizontal direction in FIG. 6) in the first bonded prism 56.

In addition, the position adjustment unit 72 is formed at the slide unit 70. The position adjustment unit 72 comprises a position adjustment screw 104 and a slide guide 106 formed on the slide plate 94. When the position adjustment screw 104 is rotated, the slide plate 94 can slide along the reference plate 92 in the horizontal direction (in the lateral direction in FIG. 6).

A light source unit 74 is formed at the upper left of the holder 68. The light source unit 74 has a light source 108 and an illumination optical system 110 for making the light from the light source 108 incident on the pre-dichroic prism 64 formed by the first bonded prism 56 and the second bonded prism 60 held by the holder 68. The light source 108 is capable of outputting a blue light. Also, the light source 108 is arranged so that the light axis of the blue light outputted from the light source 108 toward the holder 68 may be arranged perpendicularly to the plane including the end face of the projection 84c and the end face of the projection 84d.

Moreover, the image display unit 76 is formed at the lower left part the holder 68. The image display unit 76 has a so-called screen 112, and a focusing optical system 114 so that a blue light is focused on the screen 112. The blue light is outputted from the light source unit 74 and made incident on the pre-dichroic prism 64, and reflected by the first bonded face 20 and the third bonded face 24. The screen 112 is arranged in parallel to the plane including the end face of the projection 84a and the end face of the projection 84b.

Next, a manufacturing procedure of the dichroic prism 10 from the pre-dichroic prism 64, using the prism manufacturing device 66, will be explained.

First, the first bonded prism 56 is placed on the holding unit 82, setting the first reference plane 58 upward. As described above, the plane including the end face of the projection 84a and the end face of the projection 84b, and the plane including the end face of the projection 84c and the end face of the projection 84d are arranged perpendicularly to each other. Therefore, when the first bonded prism 56 is supported by the projections 84a, 84b, 84c and 84d, the first reference plane 58 becomes horizontal.

The first reference plane 58 of the first bonded prism 56, and the second reference plane 62 of the second bonded prism 60 are brought into contact facing each other to form a pre-dichroic prism 64. Note that the ultraviolet curable resin is coated onto the first reference plane 58 and/or the second reference plane 62 previously.

The distance between the position adjustment plate 100 and the position adjustment plate 102 is shorter than the widths of the first reference plane 58 and the second reference plane 62. Therefore, the position adjustment plate 100 is in contact with the third side face 44 of the third right angle prism 16 in the second bonded prism 60, and the position adjustment plate 102 is in contact with the third side face 50 of the fourth right angle prism 18.

Next, a reference chart 116 is arranged between the light source unit 74 and the pre-dichroic prism 64 as a reference image. As the reference chart 116, a flat plate having vertical stripes, horizontal stripes and the like formed thereon may be used. The reference chart 116 is arranged so as to be perpendicular to the light axis of the blue light outputted from the light source unit 74.

Here, the blue light is outputted from the light source 108, to be irradiated onto the reference chart 116. Then, the blue light having reference image information on the reference chart 116 is made incident on the third side face 44 of the third right angle prism 16 in the pre-dichroic prism 64. The blue light made incident on the pre-dichroic prism 64 is reflected by the first bonded face 20 and the third bonded face 24 having a dichroic film for blue light. The leg 78 and the leg 80 are arranged separate from each other by a distance slightly shorter than the height of the dichroic prism 10 shown in FIG. 1A. Therefore, the blue light reflected by the pre-dichroic prism 64 can be made incident from the holder 68 onto the focusing optical system 114. Then, the blue light outputted from the pre-dichroic prism 64 forms an image of the reference chart 116 on the screen 112 by the focusing optical system 114.

Thereafter, the position adjustment screw 104 is rotated, to thereby move the slide plate 94 in the lateral direction of FIG. 6 with respect to the reference plate 92. Since the position adjustment plates 100 and 102 are in contact with the pre-dichroic prism 64 and the slide plate 94 slides along the reference plate 92, one of the position adjustment plates 100 and 102 pushes the second bonded prism 60 toward the sliding direction of the slide plate 94. Thus, the first bonded face 20 and the third bonded face 24 are deviated, thereby changing the images on the screen 112. As described above, the first bonded face 20 and the third bonded face 24 are deviated, to thereby adjust the position of the second bonded prism 60 so that the image on the screen 112 corresponds to the image of the reference chart 116. When the first bonded face 20 and the third bonded face 24 are deviated by a suitable amount of distance and the image on the screen 112 corresponds to the image of the reference chart 116, the pre-dichroic prism 64 is radiated with ultraviolet, to thereby cure the ultraviolet curable resin. The dichroic prism 10 is thus formed.

The second bonded face 22 and the fourth bonded face 26 in the dichroic prism 10 manufactured in the above way have dichroic films for red light and form a single plane. Moreover, the first bonded face 20 and the third bonded face 24 having dichroic films for blue light are almost parallel to each other and are deviated by an adequate distance. Incidentally, as described above, the distance of deviation is adjusted so that the image of the reference chart 116 on the screen 112 corresponds to the reference chart 116. Therefore, the distance may be 0, i.e., the first bonded face 20 and the third bonded face 24 may coincide. In the dichroic prism 10 manufactured by the above manufacturing method, when the green light is made incident on the third side face 32 of the first right angle prism 12, and the red light is made incident on the third side face 38 of the second right angle prism 14, and the blue light is made incident on the third side face 50 of the fourth right angle prism 18, the blue light and the red light are respectively reflected by the dichroic film for blue light and the dichroic film for red light toward the third side face 44 of the third right angle prism 16, and, at the same time, the green light transmits the above dichroic film. Accordingly, the green light, the red light and the blue light which are made incident on the dichroic prism 10 are outputted as one light from the third side face 44 of the third right angle prism 16.

When the dichroic prism 10 is used as a color synthesis optical element by a liquid crystal projector, the synthesized light is projected on the screen, forming a full color image.

Figure 8:
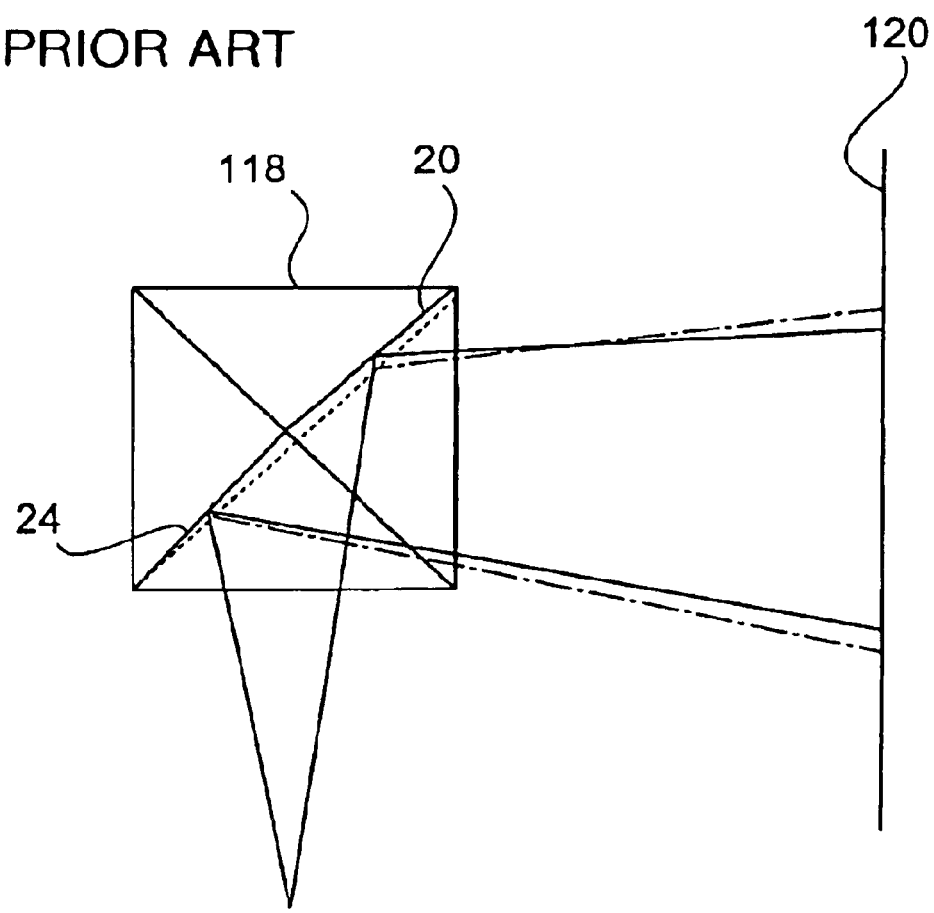
FIG. 8 is a view for explaining a conventional dichroic prism.

In order to improve the quality of the image formed on the screen, the conventional dichroic prism 118 has been manufactured so as to shorten the distance between the first bonded face 20 and the third bonded face 24 (so as to intersect at one point as shown in FIG. 8). However, surface polishing is provided for the first side face 28 and the second side face 30 in the first right angle prism 12, and angle α formed thereby is substantially 90 degrees. However, in some cases, an angle deviation of about 1 second may be generated. Such an angle deviation maybe similarly generated in the second to fourth right angle prisms 14 to 18. Then, such an angle deviation has an adverse effect on the angle formed by the first bonded face 20 and the third bonded face 24, and thereby the angle formed by the first bonded face 20 and the third bonded face 24 silghtly deviates from 180 degrees. This is because the first bonded prism 56 and the second bonded prism 60 is constructed such that planes which face the peaks thereof, each forming a right angle, become flat. Therefore, the first bonded face 20 and the third bonded face 24 could not form a single plane. In this way, due to the fact that the angle formed by the first bonded face 20 and the third bonded face 24 is slightly deviated from 180 degrees, there has been the following adverse effects on the image.

Specifically, as shown in FIG. 8, when the first bonded face 20 and the third bonded face 24 intersect at one point, and when the blue light is made incident on the dichroic prism 118, the blue light is reflected in a different direction from a light path (shown by alternate long and short dashed lines in FIG. 8) in the case where the first bonded face 20 and the third bonded face 24 form a single plane as shown by the dotted line. Therefore, the size of the image projected on the screen 120 is enlarged (or reduced) differently from the image reflected by the plane shown by the dotted line of FIG. 8. Meanwhile, the red light is reflected by the second bonded face 22 and the fourth bonded face 26 arranged on the same plane, and the green light is transmitted therethrough, thereby generating no enlargement or reduction in the image size as described above. Therefore, when the image is formed by the light outputted from the dichroic prism 118, only blue light is different in image size, there by ultimately degrading the image quality of the full color image. Note that, in order to obviate the degradation of the image quality due to the adverse effect of the right angle precision of the first to fourth right angle prisms 12 to 18, it is considered to improve the polishing precision of the first side faces 28, 34, 40, and 46 and the second side faces 30, 36, 42, and 48 in the first to fourth right angle prisms 12 to 18. However, there has been a possibility of a cost increase for polishing.

Meanwhile, the dichroic prism 10 according to the present invention is manufactured, intentionally deviating the first bonded face 20 and the third bonded face 24 as shown in FIG. 1B. Such a deviation is adjusted so that the image formed on the screen 112 by the blue light corresponds to the image of the reference chart 116. This blue light is made incident on and reflected by the pre-dichroic prism 64, and has the image information of the reference chart 116.

Specifically, in this embodiment, the adverse effects on the image quality caused by the deviation between the first bonded face 20 and the third bonded face 24 is conversely used to control the deviation between the first bonded face 20 and the third bonded face 24 so as to improve the image quality. The deviation is controlled while viewing the actual image as described above. Therefore, the degradation of the image quality caused by the influences of the right angle precision and a space between the first bonded face 20 and the third bonded face 24 is prevented. Moreover, by controlling the deviation to reduce the influence of the right angle precision, an optimal image quality can be obtained without polishing the first side faces 28, 34, 40 and 46 and the second side faces 30, 36, 42 and 48 in the first to fourth right angle prisms 12 to 18 with even higher precision than the conventional polishing.

As described above, the preferred embodiments of the present invention has been explained in detail. However, the present invention is not limited to the above-described embodiments.

For example, the following manner may be employed to form the dichroic film for blue light included in the first bonded face 20 and the third bonded face 24, and the dichroic film for red light included in the second bonded face 22 and the fourth bonded face 26. The first bonded prism 56 and the second bonded prism 60 are respectively manufactured by using the first right angle prism and the fourth right angle prism 18. The first right angle prism includes the first side face having a dichroic film for blue light formed thereon and the fourth right angle prism 18 includes the second side face having a dichroic film for blue light formed thereon. Thereafter, on either the first bonded prism or the second bonded prism, a dichroic film for red light is formed on the plane thereof facing opposite the peak which constitutes the right angle. Then, the first bonded prism and the second bonded prism are bonded to form a dichroic prism.

Moreover, the first color light is defined as a blue light, and the second color light is defined as a red light. However the color lights may not be limited thereto.

Further, in the preferred embodiments of the present invention, the dichroic prism is used for the color synthesis optical element in the liquid crystal projector. However, the dichroic prism may not be used in the liquid crystal projector.

Still further, the ultraviolet curable resin is used for bonding of the first to fourth right angle prisms. However bonding agents are not limited thereto. The first to fourth right angle prisms may be bonded by a bonding agent having the same refractive index as that of the first to fourth right angle prisms and bonds these prisms by an external stimulation such as light and heat. Alternatively, a bonding agent may be used which can bond the first to fourth right angle prisms even after a period of time required for adjusting the positions of the first to fourth right angle prisms.

In the preferred embodiments according to the present invention, the above-described prism manufacturing device 66 is designed to have legs 78 and 80 and connected by prismatic body 86. However, the prism manufacturing device may have a box-shape and the side face thereof may have an opening formed thereon so that the light outputted from the pre-dichroic prism 64 can pass therethrough. Further, the position adjustment plates 100 and 102 are arranged so as to extend toward the leg 78 from the side face 98 of the slide plate 94. However, the slide plate may be formed on the entire upper surface of the reference plate 92 and an opening slightly smaller than the opening part 96 of the reference plate 92 is formed on the slide plate. Thereafter, the second bonded prism is pushed by the inner side edges of the opening.

What is claimed is:

1. A dichroic prism comprising a first right angle prism, a second right angle prism, a third right angle prism, and a fourth right angle prism, each having a first and second side faces substantially perpendicular to each other, wherein the dichroic prism is a columnar body having a square shape in lateral cross section, the columnar body including: a first bonded face formed by bonding the first side face of the first right angle prism and the second side face of the second right angle prism; a second bonded face formed by bonding the first side face of the second right angle prism and the second side face of the third right angle prism; a third bonded face formed by bonding the first side face of the third right angle prism and the second side face of the fourth right angle prism; and a fourth bonded face by bonding the first side face of the fourth right angle prism and the second side face of the first right angle prism, wherein the first bonded face and the third bonded face have dichroic films for first color light, which reflect the first color light and transmit therethrough second color light different in color from the first color light, wherein the second bonded face and the fourth bonded face have dichroic films for the second color light, which reflect the second color light and transmit the first color light therethrough, wherein the second bonded face and the fourth bonded face are arranged on the same plane, and wherein the third bonded face is deviated from the first bonded face by a predetermined distance.

2. The dichroic prism according to claim 1, wherein the distance is one, in which an image formed of the first color light having predetermined reference image information coincides with an image corresponding to the reference image information, the first color light being allowed to be incident onto the first and third bonded faces and being reflected thereon.

3. The dichroic prism according to claim 1, wherein the first color light is light having a first color constituting three primary colors of light, the second color light is light having a second color constituting the three primary colors of light, and the dichroic film for the first color light and the dichroic film for the second color light can transmit therethrough a remaining third color constituting the three primary colors of light.

4. A dichroic prism manufacturing method, comprising:

a first step of preparing a first right angle prism, a second right angle prism, a third right angle prism, and a fourth right angle prism, each having first and second side faces substantially perpendicular to each other;

a second step of forming a dichroic film for first color light on the first side face of the first right angle prism, the dichroic film for the first color light reflecting the first color light and transmitting therethrough second color light different in color from the first color light, and forming a dichroic film for the second color light on the second side face of the first angle prism, the dichroic film for the second color light reflecting the second color light and transmitting the first color light therethrough;

a third step of forming the dichroic film for the second color light on the first side face of the second right angle prism;

a fourth step of forming the dichroic film for the first color light on the second side face of the fourth right angle prism;

a fifth step of arranging the second side face of the first right angle prism and the first side face of the second right angle prism on the same plane, and of bonding the first side face of the first right angle prism and the second side face of the second right angle prism, thus manufacturing a first bonded prism in which a first bonded face having the dichroic film for the first color light is formed;

a sixth step of arranging the second side face of the third right angle prism and the first side face of the fourth right angle prism on the same plane, and of bonding the first side face of the third right angle prism and the second side face of the fourth right angle prism, thus manufacturing a second bonded prism in which a third bonded face having the dichroic film for the first color light is formed;

a seventh step of constituting a pre-dichroic prism by allowing a plane, which is formed of the second side face of the first right angle prism and the first side face of the second right angle prism in the first bonded prism, and a plane, which is formed of the second side face of the third right angle prism and the first side face of the fourth right angle prism in the second bonded prism, to face to each other and to contact each other;

an eighth step of adjusting position of the second bonded prism with respect to the first bonded prism such that an image formed of the first color light having predetermined reference image information coincides with an image corresponding to the reference image information, the first color light being allowed to be incident onto the first and third bonded faces in the pre-dichroic prism and being reflected thereon, thus deviating the first bonded face and the third bonded face from each other; and a ninth step of bonding the first bonded prism and the second bonded prism, thus forming the second bonded face and the fourth bonded face, each having the dichroic film for the second color light.

5. The dichroic prism manufacturing method according to claim 4, further comprising:

a tenth step of forming the dichroic film for the first color light on the first side face of the first right angle prism, the tenth step replacing the second step and the third step;

an eleventh step of forming the dichroic film for the second color light on any one of the plane, which is formed of the second side face of the first right angle prism and the first side face of the second right angle prism in the first bonded prism, and the plane, which is formed of the second side face of the third right angle prism and the first side face of the fourth right angle prism in the second bonded prism, the eleventh step replacing the seventh step; and a twelfth step of allowing the first bonded prism and the second bonded prism to contact each other with the dichroic film for the second color light interposed therebetween, thus constituting the pre-dichroic prism.

6. The dichroic prism manufacturing method according to claim 4, wherein an ultraviolet curable resin is used for bonding the first right angle prism and the second right angle prism, for bonding the third right angle prism and the fourth right angle prism, and for bonding the first bonded prism and the second bonded prism, the ultraviolet curable resin having the same refractive index as refractive indices of the first to fourth right angle prisms and being cured by being irradiated with ultraviolet rays.

7. The dichroic prism manufacturing method according to claim 4, wherein the first color light is light having a first color constituting three primary colors of light, the second color light is light having a second color constituting the three primary colors of light, and the dichroic film for the first color light and the dichroic film for the second color light can transmit therethrough a remaining third color constituting the three primary colors of light.

8. A dichroic prism manufacturing device used for performing the dichroic prism manufacturing method according to claim 4, comprising:

a holder having a holding portion which holds the first bonded prism;

a slide unit provided slidably on the holder, the slide unit being allowed to contact the second bonded prism arranged to constitute the pre-dichroic prism together with the first bonded prism held by the holder, and sliding the second bonded prism with respect to the first bonded prism;

a position adjustment unit for sliding the slide unit with respect to the holder, the position adjustment unit being attached to the slide unit;

a light source unit for making the light incident on the pre-dichroic prism held by the holding portion; and an image display unit for displaying the image formed of the light from the light source unit, the light being made incident onto the pre-dichroic prism held on the holder and being reflected on the first bonded face and the third bonded face.

* * * * *